US010346516B2

(12) United States Patent
Bentov et al.

(10) Patent No.: US 10,346,516 B2
(45) Date of Patent: Jul. 9, 2019

(54) READABLE STRUCTURAL TEXT-BASED REPRESENTATION OF ACTIVITY FLOWS

(71) Applicant: International Business Machines Corporation, Armonk, NY (US)

(72) Inventors: Tomer Bentov, Bikat Beit Hakerem (IL); Samuel Kallner, Menashe (IL); Dany Moshkovich, Yokneam Ilit (IL); Balunaini Prasad, Bangalore (IN); Ravi Ray, Uttar Pradesh (IN); Yoav Rubin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 13/778,165

(22) Filed: Feb. 27, 2013

(65) Prior Publication Data

US 2014/0245233 A1      Aug. 28, 2014

(51) Int. Cl.
*G06F 17/21*        (2006.01)
*G06F 17/22*        (2006.01)

(52) U.S. Cl.
CPC ............................... *G06F 17/2241* (2013.01)

(58) Field of Classification Search
CPC .............. G06F 3/00; G06F 17/30864; G06F 17/30867; G06F 17/30011; G06F 17/30477; G06F 17/30554; G06F 17/30882; G06F 3/0483; G06F 17/3053; G06F 17/30572; G06F 17/30064; G06F 17/30716; G06F 3/0482; G06F 17/30345; G06F 17/30539
USPC ........................................ 715/765, 786, 853
See application file for complete search history.

(56) References Cited

U.S. PATENT DOCUMENTS

| 5,838,317 | A | * | 11/1998 | Bolnick | G06F 3/0481 |
| | | | | | 707/999.007 |
| 6,043,817 | A | * | 3/2000 | Bolnick | G06F 3/0481 |
| | | | | | 715/788 |
| 7,305,415 | B2 | | 12/2007 | Chau et al. | |
| 8,826,230 | B1 | * | 9/2014 | Michelsen | 717/109 |
| 8,863,032 | B2 | * | 10/2014 | Nicol | G06F 3/0482 |
| | | | | | 715/838 |
| 2002/0116362 | A1 | * | 8/2002 | Li et al. | 707/1 |
| 2005/0071312 | A1 | * | 3/2005 | Chau et al. | 707/1 |
| 2005/0071347 | A1 | * | 3/2005 | Chau et al. | 707/100 |
| 2009/0249187 | A1 | * | 10/2009 | Morris et al. | 715/234 |
| 2011/0225548 | A1 | * | 9/2011 | Callens | G06F 3/0481 |
| | | | | | 715/835 |
| 2012/0185491 | A1 | * | 7/2012 | Mansfield | G06F 17/2241 |
| | | | | | 707/752 |

* cited by examiner

*Primary Examiner* — Di Xiao
(74) *Attorney, Agent, or Firm* — G.E. Eherlich (57) ABSTRACT

A computerized method for converting a graphical representation of an activity flow to a structural text-based representation according to a plurality of human readability considerations, said computerized method comprising: converting a graphical representation of an activity flow to a structural text-based representation having a plurality of text elements which are related to one another in a hierarchical manner; identifying a subset of said plurality of text elements having an equal number of hierarchical degrees of separation from a root of said plurality of text elements; acquiring a plurality of human readability rules; ordering said subset of plurality of text elements by applying said plurality of human readability rules to said subset of plurality of text elements.

15 Claims, 7 Drawing Sheets

Nested List Text 100

1. Launch Step     101
   Enter a description of the step
2. Step 1 Assign to a role or workgroup     102
   Enter a description of the step
3. Topmost split Assign to a role or workgroup     103
   Enter a description of the step
4. Decision point     104
   - 4.1 Response     105    [Top 1]
     - 4.1.1 Inner split Assign to a role or workgroup     107
       Enter a description of the step
     - 4.1.2 Decision point     108
       - 4.1.2.1 Response     112    [Inner 1]
         - 4.1.2.1.1 Activity     114
           Enter a description of the step
       - 4.1.2.2 Response     113    [Inner 2]
         - 4.1.2.2.1 Activity     115
           Enter a description of the step
     - 4.1.3 Inner join Assign to a role or workgroup     109
       Enter a description of the step
   - 4.2 Response     106    [Top 2]
     - 4.2.1 Step A Assign to a role or workgroup     110
       Enter a description of the step
     - 4.2.2 Step B Assign to a role or workgroup     111
       Enter a description of the step
5. Outer join Assign to a role or workgroup     116
   Enter a description of the step

READABLE STRUCTURAL TEXT-BASED REPRESENTATION OF ACTIVITY FLOWS

BACKGROUND

The present invention, in some embodiments thereof, relates to computer implemented methods, computer programs and systems for converting graphical representations of activity flows to human readable textual representations and, more specifically, but not exclusively, to computer implemented methods, computer programs and systems for converting graphical representations of activity flows to human readable nested-lists.

An activity flow is a set of related, structured processes producing a specific service and/or product, as well as the relationships between these activities. The relationships are often described as a sequence and/or a hierarchy with or without decision points. Decision points can be based on external data, user preferences and/or data in the process.

Business entities often model their activity flows. Such models assist business entities with diverse activities: Improving existing processes, Examining processes across lines of business to discover which one is the best of breed in entities merging, Automating processes, and Complying with government regulations requiring activity flows documentation to name a few.

Activity flow models can be roughly classified as graphical and non-graphical representations. A graphical representation may be a flowchart, a mathematic graph having nodes and edges, a bar graph, a topological chart, a process matrix and/or the likes. Some of these representations, for example, a mathematic graph, are more commonly used in conjunction with an activity flow. A non graphical activity flow model can be text-based. The text can be structured or unstructured.

Editing tools for modeling activity flows benefit from offering both graphical and non-graphical representations. Editing tools are frequently utilized for modeling activity flows. Generation of activity flow models is typically a shared effort performed by multiple stakeholders within a business entity. Different stakeholders posse different knowledge elements and expertise required for modeling an activity flow. Such collaborative efforts benefit from editing tools' assistance. The preferred representation of activity flow models varies between the stakeholders. The preferred representation is typically correlated with the stakeholder's proficiency. For example, technology savvy users, which are familiar with the graph metaphor, tend to prefer a mathematic graph representation. On the other hand, professionals in their domain (e.g., physicians), are typically not used to working with a graph metaphor, but are costumed to interacting with text editors. Such professionals usually tend to prefer a textual based representation. Editing tools for modeling activity flows catering to both of these needs include dual representations: graphical and non-graphical. Such dual representations require conversion between the graphical and the non-graphical representation and vice versa.

Converting an activity flow's graphical representation to a non-graphical representation is not a straight forward task. There is no direct equivalence between graphical representations and non-graphical representations. Instead, alternative conversion methodologies exist. Consequently, dissimilar non-graphical representations may be generated for the same graphical representation of an activity flow. This challenge increases with the complexity of the modeled activity flow's sequence. Some alternative conversion methodologies pose challenges such as conversion consistency. For example, the original graphical representation may differ from the re-conversion result obtained after converting the non-graphical representation back to a graphical representation.

Despite the above mentioned challenges in round-trip conversion between graphical and non-graphical representations of activity flows, tools for editing both graphical and non-graphical activity flow models exist. Among them are: IBM® WebSphere Business Modeler®, IBM® Business Process Management® (BPM), IBM® WebShere Lombardi edition, SAP NetWeaver BPM, Appian BPM Suite, TIBCO BPM.

The above mentioned tools, as well as other tools which capture activity flow models, employ different formats for graphical representations. These include Business Process Model and Notation (BPMN), XML Process Definition Language (XPDL) and Business Process Execution Language (BPEL).

The above mentioned tools, as well as other tools capturing activity flow models, employ structured text for non-graphical representations. Several formats are utilized for capturing and displaying structured text. These formats include Extensible Markup Language (XML), XML Process Definition Language (XPDL) and Business Process Execution Language for Web Services (BPEL4WS). XPDL is a format standardized by the Workflow Management Coalition (WfMC) to interchange activity flow definitions between different modeling tools. XPDL supplements an XML schema with process oriented elements. BPEL4WS combines Web services Flow Language (WSFL), which provides support for graph oriented processes, and XML language (XLANG), which has structural constructs for processes, into one package that supports implementation of an activity flow.

SUMMARY

According to an aspect of some embodiments of the present invention there is provided a computerized method for converting a graphical representation of an activity flow to a structural text-based representation according to a plurality of human readability considerations, the computerized method comprising: converting a graphical representation of an activity flow to a structural text-based representation having a plurality of text elements which are related to one another in a hierarchical manner; identifying a subset of the plurality of text elements having an equal number of hierarchical degrees of separation from a root of the plurality of text elements; acquiring a plurality of human readability rules; ordering the subset of plurality of text elements by applying the plurality of human readability rules to the subset of plurality of text elements.

Optionally, data of the structural text-based representation is arranged as a nested list. Optionally, the plurality of human readability rules comprises at least one of alphabetical sorting the subset of plurality of text elements and sorting the subset of plurality of text elements according to user provided rating. Optionally, at least one of the plurality of human readability rules is defined according to a layout of a plurality of graph elements of the graphical representation of an activity flow. Optionally, the layout is at least one of an order of a plurality of edges, an orientation in a left to right axis, an orientation in a right to left axis and orientation in a up to down axis. Optionally, the layout is chosen according to at least one of a language in which the activity flow was developed and a physical location indicating a visual order preference. Optionally, at least one of the plurality of human readability rules defines a desired hierarchy of a plurality of domain specific terms wherein at least one of the plurality of domain specific terms appears in the subset of plurality of text elements of the structural text-based representation. Optionally, the domain is workflow approval. Optionally, the converting is performed by: pre-processing the graphical representation, thereby detecting at least one of a cycle route and a backward route; building a flow content; detecting a plurality of split nodes and a plurality of join nodes; defining a plurality of basins by matching each of a plurality of split nodes with a corresponding join node of the plurality of join nodes; generating a plurality of nesting text elements for each basin of detected the plurality of basins. Optionally, the method further comprises measuring usage frequency of a plurality of elements of the structural text-based representation and the graphical representation; wherein at least one of the plurality of human readability rules is defined according to measured the usage frequency. Optionally, the structural text-based representation is deviates from a one to one correspondence of the graphical representation. Optionally the method further comprises: re-converting ordered the structural text-based representation to the graphical representation. Optionally the method further comprises: synchronizing elements of the structural text-based representation with elements of the a graphical representation thereby allowing edits made to elements of one representation to be propagated to the other representation.

According to another aspect of some embodiments of the present invention there is provided a computer program product for converting a graphical representation of an activity flow to a structural text-based representation according to a plurality of human readability considerations, the computer program comprising: a computer readable storage medium; first program instructions to convert a graphical representation of an activity flow to a structural text-based representation having a plurality of text elements which are related to one another in a hierarchical manner; second program instructions to identify a plurality of text elements having an equal number of hierarchical degrees of separation from a root of the plurality of text elements; third program instructions to acquire a plurality of human readability rules; and fourth program instructions to order the subset of plurality of text elements by applying the plurality of human readability rules to the subset of plurality of text elements; wherein the first, second, third and fourth program instructions are stored on the computer readable storage medium.

According to another aspect of some embodiments of the present invention there is provided a system for converting a graphical representation of an activity flow to a structural text-based representation according to a plurality of human readability considerations, the system comprising: a processor; a conversion module which converts, using a processor, a graphical representation of an activity flow to a structural text-based representation having a plurality of text elements which are related to one another in a hierarchical manner; readability promoting module which identifies a subset of the plurality of text elements having an equal number of hierarchical degrees of separation from a root of the plurality of text elements; a user interface for presenting at least one of the graphical representation and the structural text-based representation.

Optionally, the user interface further enables a user to provide a plurality of human readability rules. Optionally, the system further comprises: an editing module which enables a user to view and edit at least one of ordered the structural text-based representation and the graphical representation. Optionally, the editing performed on one representation is reflected in the other representation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to computer implemented methods, computer programs and systems for converting graphical representations of activity flows to human readable textual representations and, more specifically, but not exclusively, to computer implemented methods, computer programs and systems for converting graphical representations of activity flows to human readable nested-lists.

There are various transformation strategies for transforming graph representations into text based representations. One exemplary transformation strategy is based on shared node segmentation. Shared nodes, which are nodes having more than one incoming control connection, are identified. A graph is segmented according to the location of the identified shared nodes. Each segment becomes a text element, and a synchronization element is used to preserve the relation between the graph segment and the corresponding text element. Another transformation technique is based on basins. It is detailed herein as part of FIG. 6 description.

The above mentioned transformation strategies regard the resulting text as a one-to-one corresponding object: i.e. the resulting text-based representation is but a different form of the graph. However, according to some aspects of the present invention, human readability considerations are taken into account. The generated structured text-based representation may be revised, edited, modified and/or changed according to human readability considerations. Such considerations may include the layout of graph elements, usability of elements, inherent order of elements (such as, for example, alphabetical order), a logical order of elements (such as, for example, their order of appearance in a documentation article), an order dictated by domain knowledge (such as, for example, process approval in which "approve" precedes "reject") etc. The result structured text differs from a textual representation of the graph which does not take readability considerations into account. The differences may be the length of the text, the number of textual elements, the content of the textual elements, the order of the textual elements, the level of the textual elements, the number of referral to non-proximate steps (such as go-to) etc. The structured text-based representation may be more easily readable by a user, may be easier to comprehend by a user, may enable a user to locate text elements quicker, may allow group editing of similar proximate text elements, and/or may be more visually appealing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
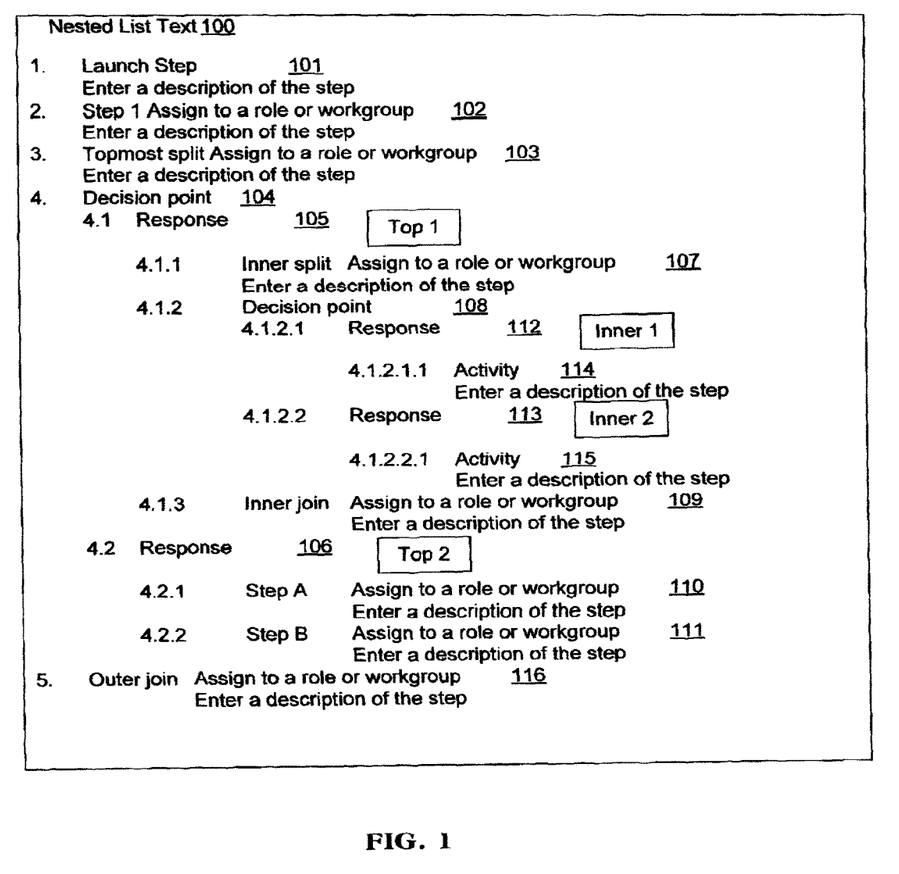
FIG. 1 is an exemplary human readable structural text-based representation, according to some embodiments of the present invention.

Reference is now made to FIG. 1, which is an exemplary human readable structural text-based representation 100, according to some embodiments of the present invention. The structured text 100 is illustrated here as a nested-list with 16 text elements 101-116. The first element 101 is the root of the nested-list. The textual elements 101-116 are related to one another in a hierarchical manner. The level of an element is determined by the number of hierarchical degrees of separation from the root 101. Here, the textual elements 101-116 are organized in 9 levels: level 1 includes element 101, level 2 includes element 102, level 3 includes element 103, level 4 includes element 104, level 4A includes elements 105-106, level 4B includes elements 107-111, level 4C includes elements 112-113, level 4D includes elements 114-115 and level 5 includes element 116. The flow between elements is dictated by the natural flow of the nested-list: Each element flows into the next one. For example step 101 continues to step 102 and step 102 in turn continues onto step 103. When there is a decision point such as in element 104, one continuation element is chosen out of the optional elements in the next level 105-106. A decision point 104, 108 may include two or more textual elements to choose from. Steps of inner levels (such as 112, 113) flow until an end point is reached with no more steps (elements 114 and 115 respectively). Then, the flow continues in outer levels (elements 114 and 115 of level 4D originated from element 104 in level 4 and so the flow continues the next outer level, which is element 116 in level 5). The flow between the levels is: 1>2>3>4>4A>4B>4C>4D>5 when elements exist in level 4C (from element 108). The flow between the levels is: 1>2>3>4>4A>4B>5 when no elements exist in level 4C (from elements 107, 109-111). Optionally, the structured text is Extendible Markup Language (XML) and/or JAVA Script Object Notation (JSON) format.

Figure 2:
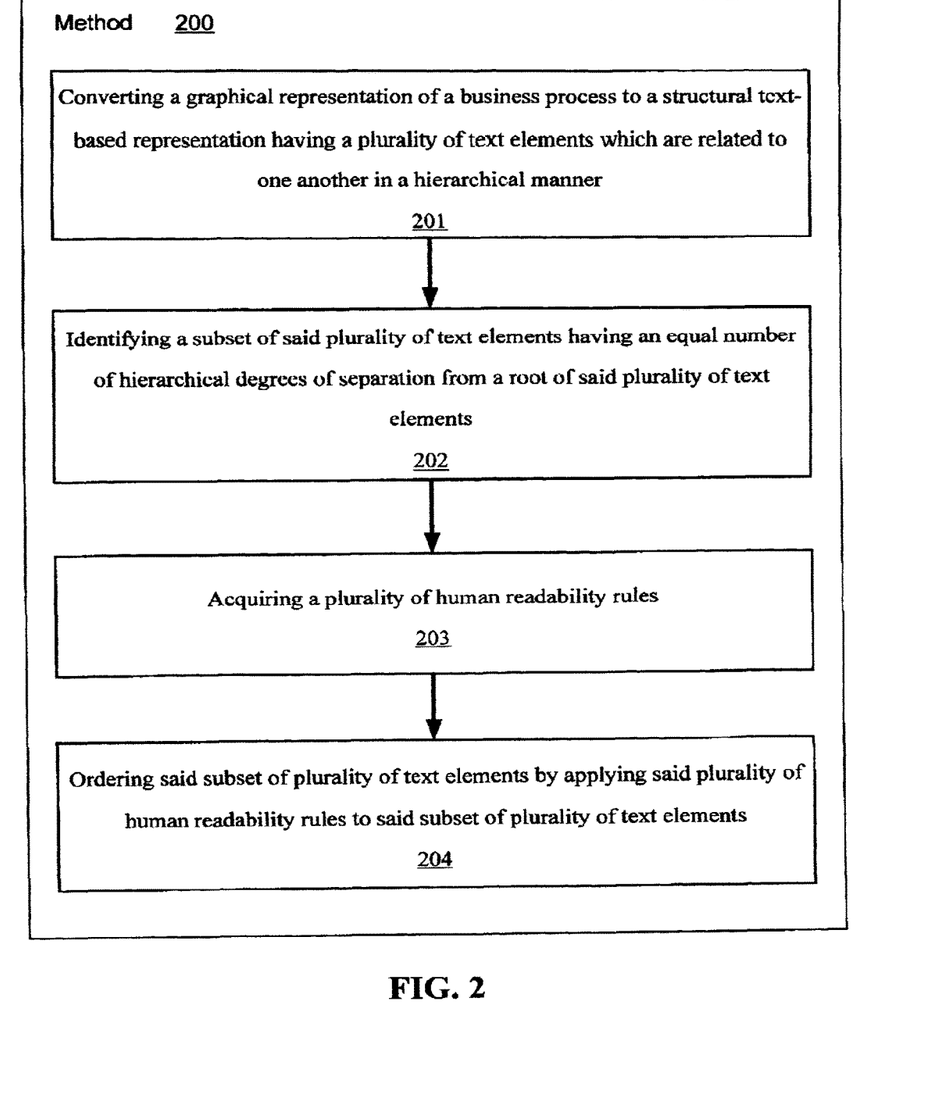
FIG. 2 is a computerized method for converting a graphical representation of an activity flow to a structural text-based representation according to a plurality of human readability considerations, according to some embodiments of the present invention.
Figure 3:
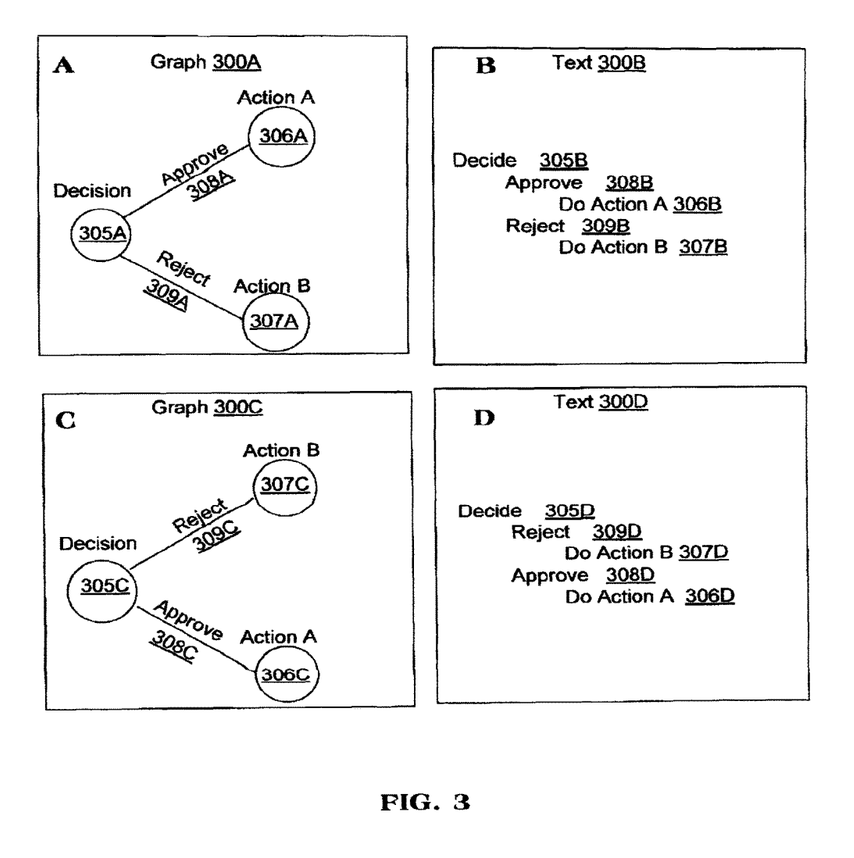
FIG. 3A is an illustration of a first version of a simple graphical representation of an approval step of an activity flow, according to some embodiments of the present invention.
FIG. 3B is an illustration of a first version of a structural text-based representation corresponding to a graphical representation, according to some embodiments of the present invention.
FIG. 3C is an illustration of a second version of a simple graphical representation of an approval step of an activity flow, according to some embodiments of the present invention.
FIG. 3D is an illustration of a second version of a structural text-based representation corresponding to a graphical representation, according to some embodiments of the present invention.
Figure 5:
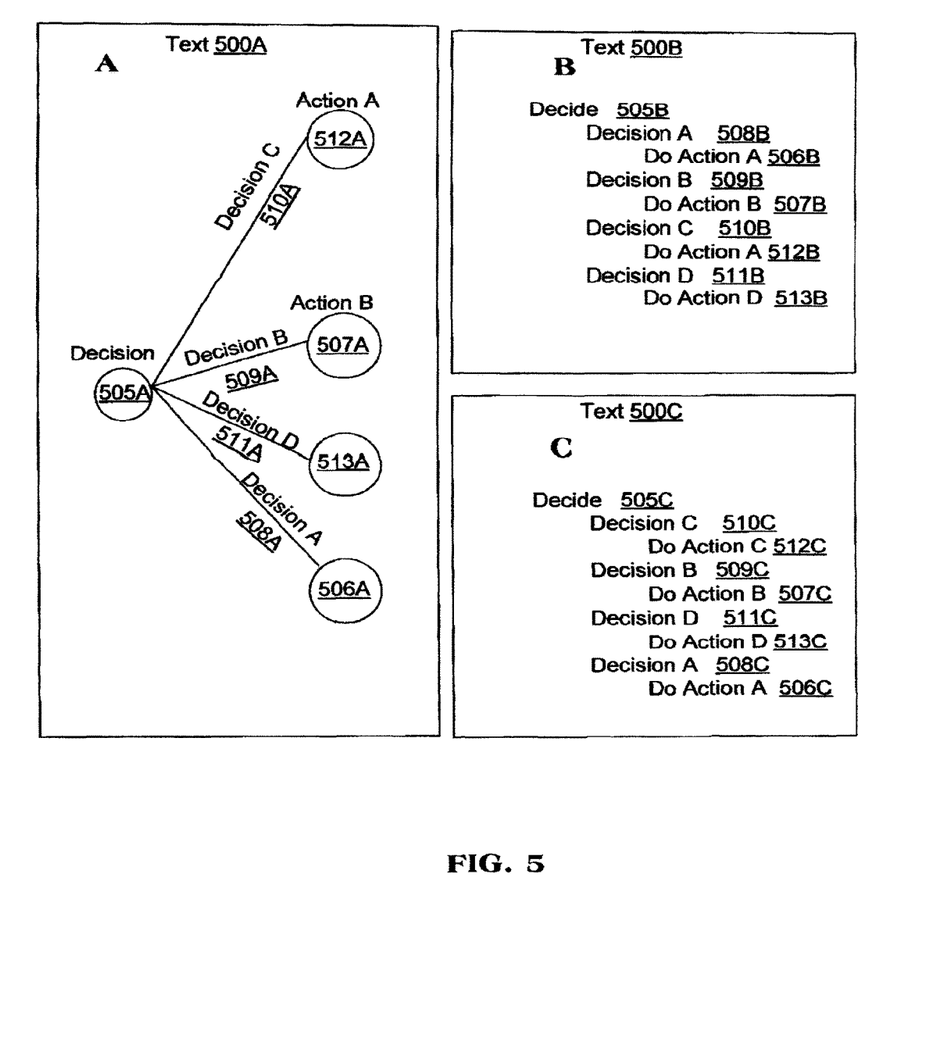
FIG. 5A is an illustration of a multi-decisions decision step in a simple graphical representation of a decision step of an activity flow, according to some embodiments of the present invention.
FIG. 5B is an illustration of a logically sorted version of a structural text-based representation corresponding to a multi-decisions decision step of a graphical representation, according to some embodiments of the present invention.
FIG. 5C is an illustration of an unsorted version of a structural text-based representation corresponding to a multi-decisions decision step of a graphical representation, according to some embodiments of the present invention.

Reference is now made to FIG. 2, which illustrates a computerized method 200 for converting a graphical representation of an activity flow to a structural text-based representation according to a plurality of human readability considerations, according to some embodiments of the present invention. First a graphical representation of an activity flow is converted to a structural text-based representation 201. The graphical representation may be a mathematical graph such as an undirected graph, a directed graph, a quiver, a tress, a bipartite graph and/or a weighted graph. Optionally, the graphical representation contains loops. The structural text-based representation 100 may be as shown in FIG. 1. The structural text-based representation 100 has a plurality of text elements which are related to one another in a hierarchical manner. Then textual elements of the same level (such as {105, 106}, {107-109}, {appliance 110, 111}, {112, 113}, {114, 115}) originating from the same element are identified and re-ordered. Though these elements are equivalent from a hierarchal point of view, their order is significant from a readability point of view. The order of reading may make a difference is the ability of a human reader to understand the flow, understand the relationship between the elements, identify quickly an element of desire, distinguish between related elements etc. A subset of the plurality of text elements having an equal number of hierarchical degrees of separation from a root of said plurality of text elements is identified 202. Then, a plurality of human readability rules is acquired 203. Then, a subset of the plurality of text elements is ordered by applying the plurality of human readability rules to the subset of plurality of text elements 204. The re-ordering may be as shown in FIG. 5.

Reference is now made to FIGS. 3A-3D illustrating two versions of a simple graphical representation of an approval step of an activity flow 3A, 3C and two versions of corresponding text-based representations 3B, 3D, according to some embodiments of the present invention. In the first graph 300A there is a decision node 305A. The two outgoing edges represent two possible decisions: Approve 308A and Reject 309A. The "Approve" decision 308A leads to action A represented as node 306A, and the "Reject" decision 309A leads to action B represented as node 307A. The second graph 300C is identical to the first graph 300A, except the layout of the "Approve" and "Reject" edges which is opposite: In the first graph 300A the "Approve" 308A edge is the top edge and in the second graph 300C the "Approve" 308C edge is the bottom edge. A conversion of a graphical representation 300A, 300C into a structured text representation 300B, 300D which is oblivious to human readability rules would typically generate from the first graph 300A the first textual representation 300B and from the second graph the second textual representation 300D. However, in this example human readability rules draw from domain knowledge of process approval domain according to which the accepted relative order of the terms "approve" and "reject" is significant and "approve" precedes "reject". Applying human readability rules applying this knowledge would result in a generation of the first textual representation 300B from both the first graph 300A and the second graph 300C.

The first textual representation 300B is more human readable than the second textual representation 300D as a reader is exposed to the "approve" text element before exposure to the "reject" text element.

Optionally, a human readability rule regards the position of a go-to command and/or another form of referral to a distant step. A go-to in the last textual element is preferred over a central and/or a beginning position of a text element in a list of same hierarchical level elements.

Figure 4:
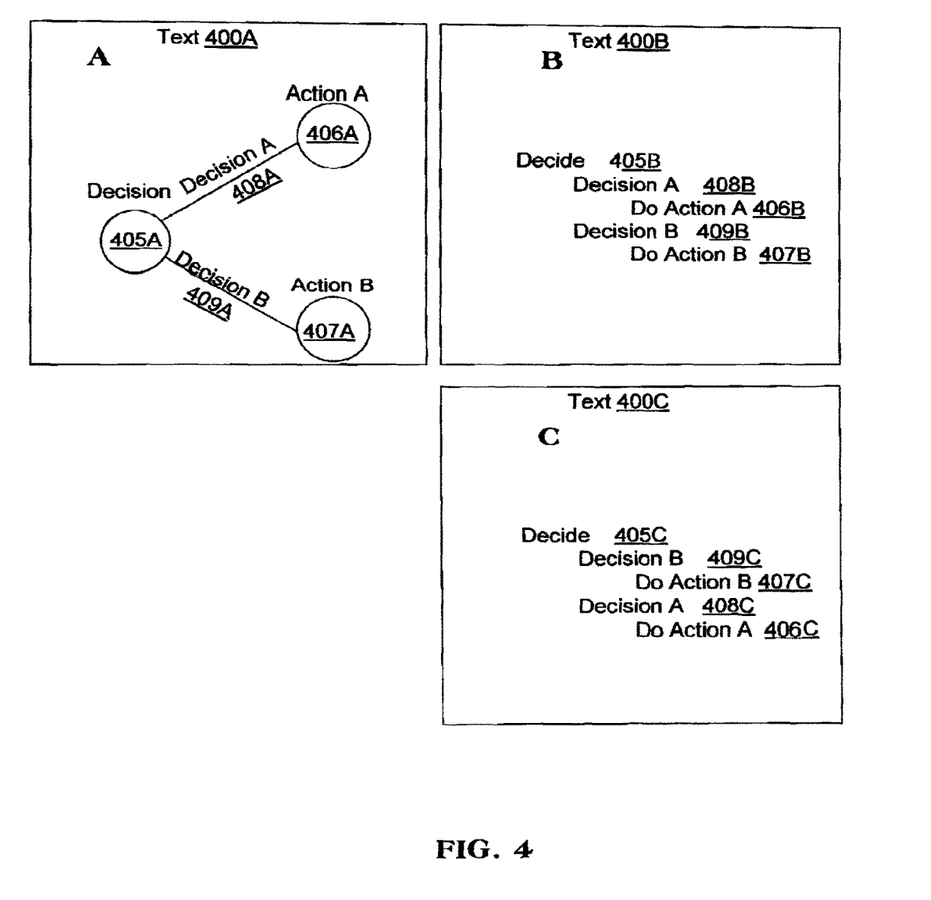
FIG. 4A is an illustration of a dichotomous decision step in a simple graphical representation of a decision step of an activity flow, according to some embodiments of the present invention.
FIG. 4B is an illustration of a first version of a structural text-based representation corresponding to a dichotomous decision step of a graphical representation, according to some embodiments of the present invention.
FIG. 4C is an illustration of a second version of a structural text-based representation corresponding to a dichotomous decision step of a graphical representation, according to some embodiments of the present invention

Reference is now made to FIGS. 4A-4C illustrating a dichotomous decision step in a simple graphical representation 400A and two version of corresponding structural text-based representations 400B, 400C, according to some embodiments of the present invention. The graph 400A is composed of a decision node 405A and two action nodes 406A, 407A. The edges connecting these nodes represent two decisions: decision A 408A and decision B 409A respectively. Two optional conversions of the graphical representation 400A into structured text representations 400B, 400C are shown. The two structural text representations differ in the order of the second level elements: 408B, 409B, 408C and 409C and their corresponding actions: 406B, 407B, 406C and 407C. The root nodes 405B, 405C are the same. If no other human readability rule applies default readability rule would prefer a layout which captures the original layout of the graph, i.e. the first text 400B in which the order of the decisions and action is identical to the graph is preferred. In the first text 400B decision A 408B and action A 406B is read by a user before decision B 409B and action B 407B. This is consistent with the graph 400A layout in which the decision A edge 408A and action A node 406A are depicted higher than decision B edge 409A and action A node 407A. Optionally, the graphs layout is interpreted according to layout preference indicating parameters such as the language at which a process is developed and/or a physical location. For example, a process developed in Hebrew and/or Arabic may be read from right to left while a process developed in Chinese may be read from top to bottom. As a default a process may be read from left to right. Parameters indicating a physical location may be indicative for the developing language and/or other visual preferences for process interpretation.

Optionally, additional data is provided about graph elements 405A-409A. One such data type is usage in a source control system. For example, the number of times an element was retrieved by a source control system in the last version may be used to account for element importance. Here decision B 409A was visited by a programmer more than decision A 408A. As a result the human readability rule which ranks elements of an equal level in the graph hierarchy according to their usability measurement would apply. As a result of that rule the second structural presentation 400C, which presents decision B 409C and action B 407C before decision A 408B and action A 406B, would be preferred. Other optional ways to measure and/or estimate an element's importance comprise: an element number of appearances in documentation records, an element location in documentation records (central versus side position relative to page edges), the number of times an element was retrieved by a source control system in the last version versus former version, an element's data size (for example: long string versus short string), an element's connectivity, the number of times an element was retrieved from a database etc. Usability measurements may be summed for a single graph element 405A-409A and/or for a subgroup, such as a group of graph elements representing a route in the graph.

Reference is now made to FIGS. 5A-5C illustrating a simple graphical representation of a decision step of an activity flow 500A and two corresponding versions of structural text-based representations with 500B, and without 500C logical sorting, according to some embodiments of the present invention. The graph 500A represents a decision node 505A with 4 decision edges 508A-511A and corresponding action nodes 506A, 507A, 512A, 513 A. The second structural text presentation 500C is a one-to-one correspondence of the graph 500A, preserving the order of the decision edges 508A-511A which matches to the order of corresponding textual elements 508C-511C. Application of a human readability rule regarding logical ordering, would result in a different structural textual representation as shown in 500B. This text 500B corresponds to the formally presented text 500C, differing in the order of the decision text elements 508B-511B and their corresponding actions 506B, 507B, 512B, 513B. In this graph the order of these elements is detected by alphabetical sorting. Optionally, the logical sorting relies on pattern recognition such as an algorithm for detecting an incremental change of an element and/or part of an element. Optionally, the logical ordering draws an order of elements from a documentation record.

Figure 6:
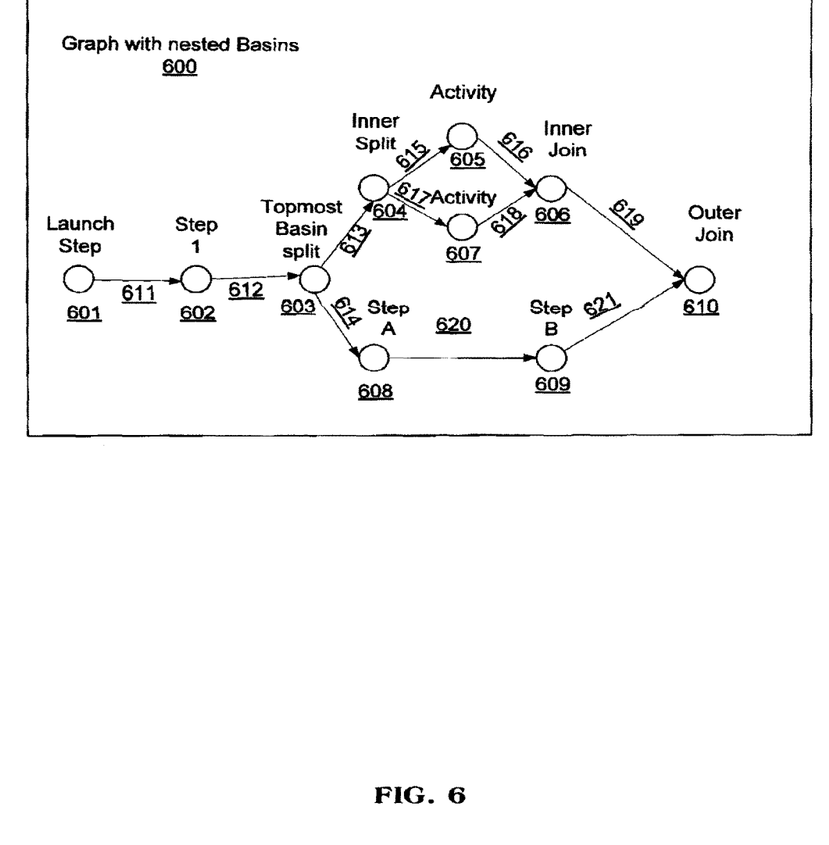
FIG. 6 is an illustration of basins in a graphical representation, according to some embodiments of the present invention.

FIG. 6 is an illustration of basins in a graphical representation, according to some embodiments of the present invention. The graph has nodes 601-610 and edges 611-621. Two types of nodes are identified within the graph: split nodes 603, 604 and join nodes 606, 610. The term "split node" as defined herein means a node from which several outgoing edges, also referred to herein as legs. The term "join node" as defined herein means a node having several incoming edges. The part between a split node and a join node is defined as a "basin". In this exemplary graph there are two basins: An outer basin—from split node 603 until join node 610 which includes nodes 604-609 and edges 613-621, and an inner basin from split node 604 until join node 606 which includes nodes 605 and 607 and edges 615-618. There are several types of split nodes: sequence (AND-split) and response (OR-split). In AND-splits splits and join nodes are explicitly marked. The marked splits and join nodes are then matched to one another like parenthesis. Optionally, a Depth First Search (DFS) traversal is performed and detected AND-splits are saved in a stack. Upon detection of an AND-join it is matched to the split popped from the stack. OR-splits and OR-joins are not marked in the graph. Unmarked nodes are candidate nodes which may be OR-splits and/or OR-joins. The flow content of the graph is built. The flow data contains an identification of the originating node and a quantity measurement. Routes carry stream data from one node to another. Route may hold several stream data elements.

The set of flow data elements is the route's content. The graph's flow content is build according to the following rules:

1) Each split node starts a "stream" with quantity of 1.
2) Each node merges its incoming routes' content. The quantity of streams that have the same identification is summed up.
3) In case the node is a split, it adds its stream to its own content.
4) Each node divides and dispenses it content's equally to the outgoing routes.
5) A node spills its content according to Table 1.

TABLE 1

Rules for building a graph flow content

| | # out-routes | | |
|---|---|---|---|
| # in-routes | 0 | 1 | >1 |
| 0 (Launch step) | NA | Continue Processing | NA |
| 1 | Spill (Dead end) | Dispense | Add own stream Dispense |
| >1 (Possible join) | Merge Don't spill Keep node's ID in a stack at the split node (Dead end join) | Merge Dispense | Merge Add own stream Dispense |

For each candidate node a split-stack is kept. The split-stack keeps candidate nodes in which the node's stream was merged. For each candidate node a join-stack is kept. The join-stack keeps candidate nodes whose content was merged for that node. Once the graph's flow content is built and the split-stack and join-stack are complete the match of OR-split and OR-joins is performed. If the stream's quantity in the node is equal to the stream quantity in the split node, then the split node is marked as 'possible split' of the join node. Decide which one of the possible origins is the correct split node. In case of multiple possible origins precedence between the candidates split nodes is determined. The later node is then removed from the stack and is no longer a candidate for an origin split node. There are multiple possible convergence states:

1) Full convergence
2) Partial convergence
3) Exit point
4) No convergence
5) Terminating node is part of another basin.

The match is performed according to the above listed order.

Figure 7:
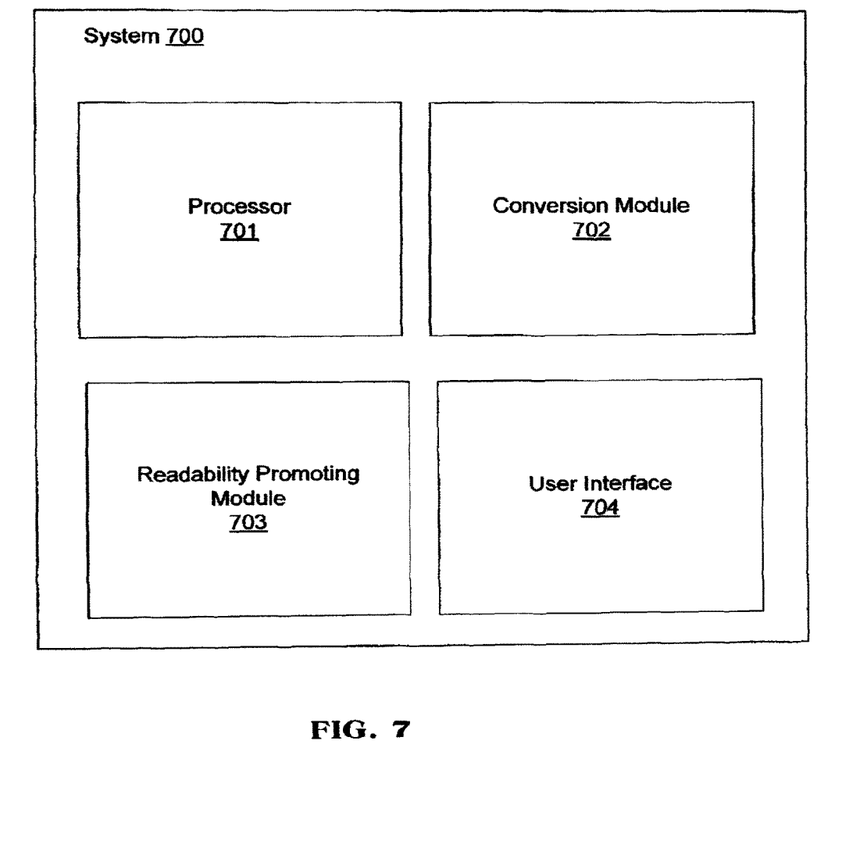
FIG. 7 is an illustration of a system for converting a graphical representation of an activity flow to a structural text-based representation according to a plurality of human readability considerations, according to some embodiments of the present invention.

FIG. 7 is an illustration of a system 700 for converting a graphical representation of an activity flow to a structural text-based representation according to a plurality of human readability considerations, according to some embodiments of the present invention. The system comprises: a processor 701, a conversion module 702, a readability promoting module 703 and a user interface 704. The conversion module 702 converts a graphical representation of an activity flow, such as the ones depicted in FIGS. 3-6, to a structural text-based representation, such as the ones depicted in FIGS. 1, 3-5. The structural text-based representation has a plurality of text elements which are related to one another in a hierarchical manner. The readability promoting module 703 identifies a subset of the text elements which have an equal number of hierarchical degrees of separation from a root of said plurality of text elements. The user interface 704 presents the graphical representation, the structural text-based representation and/or both. Optionally, the user interface enables editing of both representations. Optionally, the user interface 704 further enables a user to provide human readability rules. Optionally the representations are synchronized so an edit to one representation is reflected in the other one. Optionally, the system 700 also comprises an editing module. The editing module enables a user to view and edit one or both representations as described above.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant graphical representations and text based representations will be developed and the scope of the terms graphical representation and text based representation are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for converting a graphical representation of an activity flow to a structural text-based representation according to a plurality of human readability considerations, said computerized method comprising:
   converting a graphical representation of an activity flow to a nested list having a plurality of text elements which are related to one another in a hierarchical manner;
   identifying at least one decision point in which said activity flow proceeds to a subset of said plurality of text elements having an equal number of hierarchical degrees of separation from a root of said plurality of text elements;
   acquiring a plurality of human readability rules, each one of said plurality of human readability rules defines a preferred order between text elements of said subset, said plurality of human readability rules define ordering based on domain specific terms derived from knowledge of a domain of said activity flow;
   re-ordering said plurality of text elements of said subset according to said plurality of human readability rules to create an ordered nested list of said plurality of text elements.

2. The method of claim 1, wherein said domain specific terms based ordering of said text elements of said subset defines a desired hierarchy of a plurality of domain specific terms wherein at least one of said plurality of domain specific terms appears in said subset.

3. The method of claim 2, wherein said domain is workflow approval.

4. The method of claim 1, wherein said converting is performed by:
   pre-processing said graphical representation, thereby detecting at least one of a cycle route and a backward route;
   building a flow content;
   detecting a plurality of split nodes and a plurality of join nodes;
   defining a plurality of basins by matching each of a plurality of split nodes with a corresponding join node of said plurality of join nodes;
   generating a plurality of nesting text elements for each basin of detected said plurality of basins.

5. The method of claim 1, further comprising:
   measuring usage frequency of a plurality of elements of said ordered nested list and said graphical representation;
   wherein at least one of said plurality of human readability rules is defined according to said measured usage frequency.

6. The method of claim 1, wherein said nested list deviates from a one to one correspondence with said graphical representation.

7. The method of claim 1, further comprising:
   re-converting said ordered nested list to said a graphical representation.

8. The method of claim 1, further comprising:
   synchronizing elements of said ordered nested list with elements of said graphical representation thereby allowing edits made to elements of said nested list to be propagated to the graphical representation and vice versa.

9. The method of claim 1, wherein at least one of said plurality of human readability rules defines a desired position for a referral to a distant step, said referral is in said subset.

10. A non-transitory computer readable storage medium for converting a graphical representation of an activity flow to a structural text-based representation according to a plurality of human readability considerations, said non-transitory computer readable storage medium comprising;
   a computer program product;
   first program instructions to convert a graphical representation of an activity flow to a nested list having a plurality of text elements which are related to one another in a hierarchical manner;
   second program instructions to identify at least one decision point in which said activity flow proceeds to a subset of said plurality of text elements having an equal number of hierarchical degrees of separation from a root of said plurality of text elements;
   third program instructions to acquire a plurality of human readability rules, each one of said plurality of human readability rules defines a preferred order between text elements of said of said subset, said plurality of human readability rules define ordering based on domain specific terms derived from knowledge of a domain of said activity flow; and fourth program instructions to re-order said plurality of text elements of said subset according to said plurality of human readability rules to create an ordered nested list of said plurality of text elements;

wherein said first, second, third and fourth program instructions are stored on said non-transitory computer readable storage medium.

11. A system for converting a graphical representation of an activity flow to a structural text-based representation according to a plurality of human readability considerations, said system comprising:

a program store storing code; and a processor coupled to the program store for executing the stored code, the code comprising:

code to convert, using a processor, a graphical representation of an activity flow to a nested list having a plurality of text elements which are related to one another in a hierarchical manner;

code to identify at least one decision point in which said activity flow proceeds to a subset of said plurality of text elements having an equal number of hierarchical degrees of separation from a root of said plurality of text elements;

code to acquire a plurality of human readability rules, each one of said plurality of human readability rules defines a preferred order between of said of said subset, said plurality of human readability rules define ordering based on domain specific terms derived from knowledge of a domain of said activity flow; and code to re-order said plurality of text elements of said subset according to said plurality of human readability rules to create an ordered nested list of said plurality of text elements.

12. The system of claim 11, wherein said processor executes the stored code to enable a user to view and edit at least one of said ordered nested list and said graphical representation.

13. The system of claim 12, wherein said edit performed on said ordered nested list is reflected in said graphical representation and vice versa.

14. The system of claim 11, wherein said processor executes the stored code to enable a user to modify a length of at least one of said plurality of text elements.

15. The system of claim 11, wherein said processor executes the stored code to enable a user to modify a content of at least one of said plurality of text elements.

* * * * *